United States Patent [19]
Ohzu

[11] Patent Number: 4,954,703
[45] Date of Patent: Sep. 4, 1990

[54] COLOR LINE SENSOR APPARATUS

[75] Inventor: Hayao Ohzu, Fuchu, Japan

[73] Assignee: Canon Kabushiki Kaisha, Tokyo, Japan

[21] Appl. No.: 284,607

[22] Filed: Dec. 15, 1988

[30] Foreign Application Priority Data

Dec. 21, 1987 [JP] Japan .................. 62-321422

[51] Int. Cl.$^5$ .............................. H01J 40/14
[52] U.S. Cl. ............................ 250/208.1; 358/213.29
[58] Field of Search ................ 250/578, 211 J, 211 R, 250/208, 209; 357/24 LR, 30 H; 358/213.29

[56] References Cited

U.S. PATENT DOCUMENTS

| | | | |
|---|---|---|---|
| 4,369,372 | 1/1983 | Yoshioka et al. | 250/578 |
| 4,495,409 | 1/1985 | Baji et al. | 250/578 |
| 4,499,384 | 2/1985 | Segawa et al. | 250/578 |
| 4,641,183 | 2/1987 | Kinoshita | 358/213.29 |
| 4,644,411 | 2/1987 | Sato et al. | 250/578 |
| 4,758,734 | 7/1988 | Uchida et al. | 250/211 R |

FOREIGN PATENT DOCUMENTS 2540320 3/1984 France .
61-288576 12/1986 Japan .

Primary Examiner—David C. Nelms
Attorney, Agent, or Firm—Fitzpatrick, Cella, Harper & Scinto

[57] ABSTRACT

A color line sensor apparatus has a plurality of color line sensors comprising a plurality of lines, and a selecting circuit which can select a desired one of a plurality of lines. The line selected by the selecting circuit is scanned on the basis of a scan pulse from a single scanning circuit.

18 Claims, 4 Drawing Sheets

COLOR LINE SENSOR APPARATUS

BACKGROUND OF THE INVENTION

Field of the Invention

The present invention relates to an apparatus for driving sensors consisting of a plurality of lines and, more particularly, to a sensor drive apparatus to realize a miniaturization of the apparatus scale, a high speed operation, and the like.

Related Background Art

FIG. 4 is a diagram showing a schematic arrangement of a conventional sensor drive circuit.

In the conventional example, scanning circuits 1 to 3 are provided for color line sensors 1 to 3, respectively. Therefore, the line sensors can be independently driven by shifting the timings of start pulses $\phi_{s1}$ to $\phi_{s3}$ of the scanning circuits.

That is, by supplying the start pulse $\phi_{s1}$ and drive pulses $\phi_1$ and $\phi_2$, the scanning circuit 1 is made operative and the line sensor 1 is driven and a sensor signal $O_1$ is output through an amplifier $A_1$. Subsequently, by supplying the start pulses $\phi_{s2}$ and $\phi_{s3}$, the sensor signals of the line sensors 2 and 3 are similarly output through amplifiers $A_2$ and $A_3$, respectively.

However, in the conventional drive apparatus, a scanning circuit for each line is needed, so that there are problems such that the circuit scale enlarges, the bus line capacitances of the scanning circuits increase, and it is difficult to drive at a high speed.

On the other hand, there is also a problem such that the pitch among the line sensors is decided by the size of the scanning circuit and can be hardly set to a small pitch. Since the pitch cannot be reduced, for instance, in the case of constructing a 3-line color sensor of RGB, the optical characteristics deteriorate and the scale of the signal processing system increases.

SUMMARY OF THE INVENTION

It is an object of the present invention to solve the drawbacks in the conventional technique and to provide a color line sensor which can reduce the pitch among line sensors.

A color line sensor apparatus according to the present invention has selecting means which can select a desired one of a plurality of lines, and scans the line selected by the selecting means on the basis of a scan pulse from a scanning circuit.

By providing the selecting means, a plurality of lines can be independently driven by one scanning circuit. As compared with the conventional apparatus, the circuit scale can be reduced and high speed operation can be accomplished. The pitch among the lines can be also reduced.

The above and other objects and features of the present invention will become apparent from the following detailed description and the appended claims, with reference to the accompanying drawings.

DESCRIPTION OF THE PREFERRED EMBODIMENT

An embodiment of the present invention will be described in detail hereinbelow with reference to the drawings.

Figure 1:
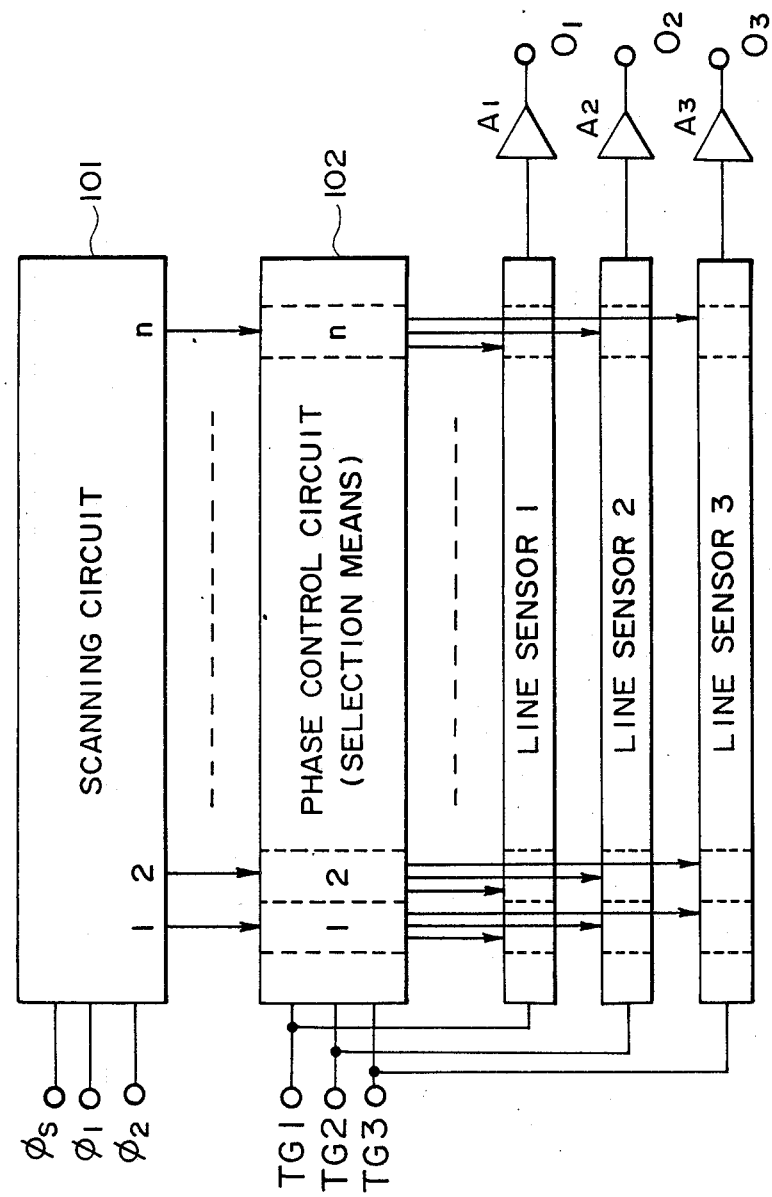
FIG. 1 is a schematic arrangement diagram for explaining the fundamental operation of a sensor drive apparatus according to the present invention.

FIG. 1 is a schematic arrangement diagram for explaining the fundamental operation of a sensor drive apparatus according to the invention. The case of three line sensors will be described as an example.

In the diagram, when a start pulse $\phi_s$ is input to a scanning circuit 101, the scanning circuit sequentially outputs n scan pulses to a phase control circuit 102 as selection means in response to the drive pulses $\phi_1$ and $\phi_2$.

The phase control circuit 102 selects an arbitrary line sensor on the basis of selection signals $TG_1$ to $TG_3$. Only the selected line sensor is scanned by the scan pulse from the scanning circuit 101 and a sensor signal from the line sensor is sequentially output.

For instance, when only the selection signal $TG_1$ is supplied, only the line sensor 1 is driven and the phase control circuit 102 sequentially outputs scan pulses to only the line sensor 1. Thus, the sensor signal of the line sensor 1 is sequentially read out through the amplifier $A_1$. Tha same shall also apply with regard to the line sensors 2 and 3.

Figure 2:
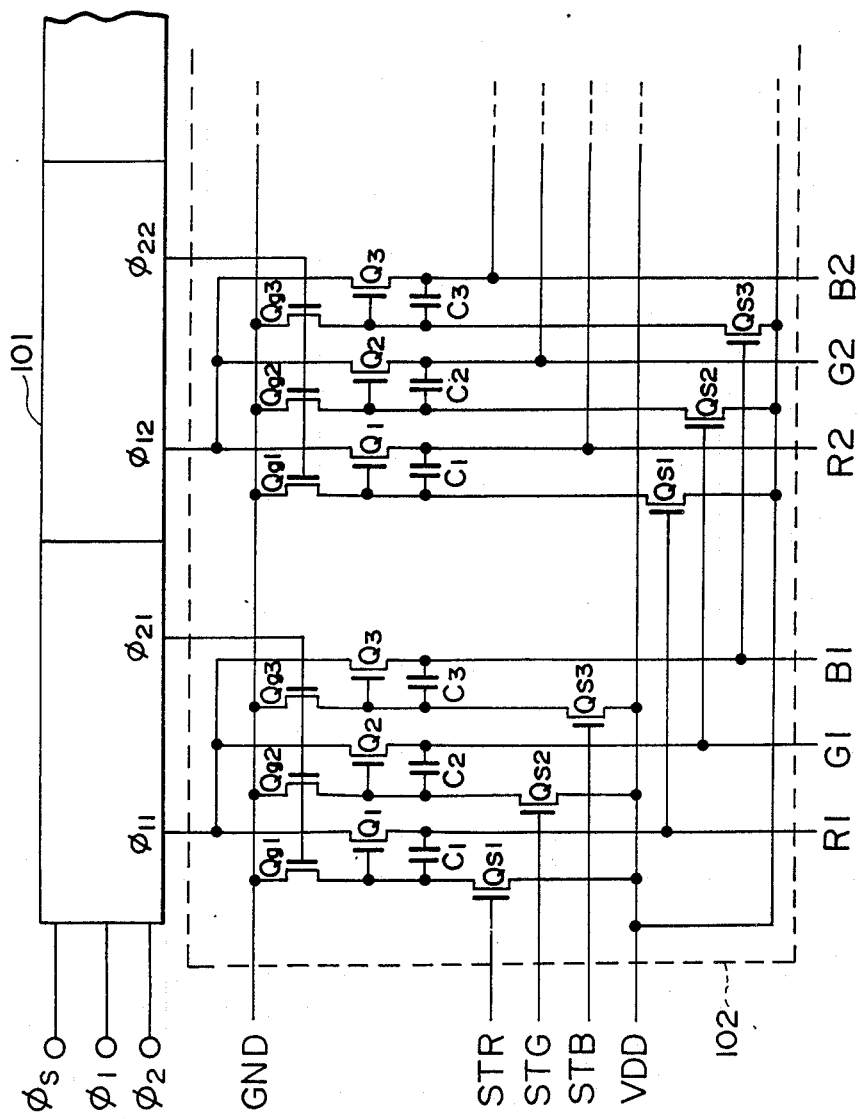
FIG. 2 is a schematic circuit diagram of an embodiment of the sensor drive apparatus of the invention.

FIG. 2 is a schematic circuit diagram of an embodiment of the sensor drive apparatus according to the invention.

When the start pulse $\phi_s$ is input, the scanning circuit 101 successively outputs scan pulses $\phi_{11}$, $\phi_{21}$, $\phi_{12}$, $\phi_{22}$, ... $\phi_{1n}$, and $\phi_{2n}$ synchronously with the drive pulses $\phi_1$ and $\phi_2$.

The phase control circuit 102 consists of n stages of circuits. Either one of the R, G, and B signals is selected by selection signals STR, STG, and STB and the scan pulse is output from each stage.

In the circuit of the first stage, the scan pulse $\phi_{11}$ of the scanning circuit 101 becomes either one of $R_1$, $G_1$, and $B_1$ signals through transistors $Q_1$ to $Q_3$.

Bootstrap capacitors $C_1$ to $C_3$ are connected between gate and source of the transistors $Q_1$ to $Q_3$. On the other hand, a grounding voltage GND is applied to each gate electrode of the transistors $Q_1$ to $Q_3$ through transistors $Q_{g1}$ to $Q_{g3}$ and a voltage VDD is also applied thereto through transistors $Q_{s1}$ to $Q_{s3}$.

The scan pulse $\phi_{21}$ is commonly input to gate electrodes of the transistors $Q_{g1}$ to $Q_{g3}$. The selection signals STR, STG, and STB are input to gate electrodes of the transistors $Q_{s1}$ to $Q_{s3}$, respectively.

The outputs $R_1$, $G_1$, and $B_1$ are input to the gate electrodes of the transistors $Q_{s1}$, $Q_{s2}$, and $Q_{s3}$ of the subsequent second stage. In a manner similar to the above, the second to nth stages are constructed. Either one of the R, G, and B signals selected by the selection signals is output from each of the stages.

Figure 3:
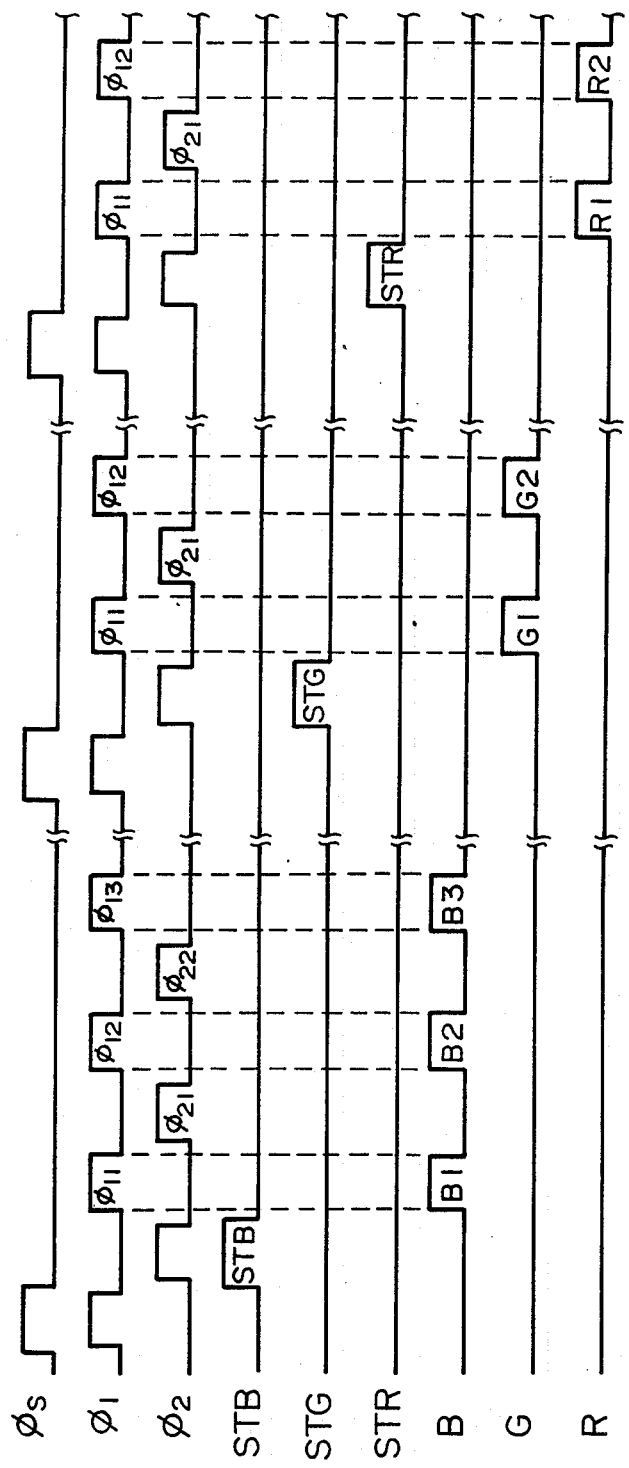
FIG. 3 is a timing chart for explaining the operation of the embodiment.
Figure 4:
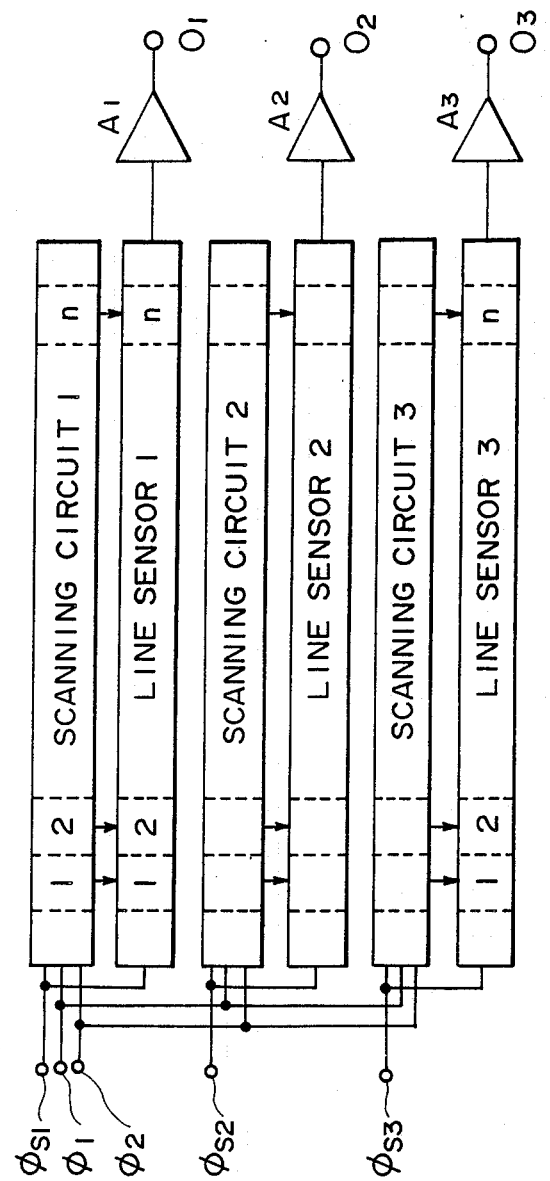
FIG. 4 is a schematic arrangement diagram of a conventional sensor drive circuit.

FIG. 3 is a timing chart for explaining the operation of the embodiment.

First, after the start pulse $\phi_s$ was supplied to the scanning circuit 101, the selection signal STB is set to 1, so that the transistor $Q_{s3}$ of the first stage is turned on. The voltage VDD is input to the gate electrode of the transistor $Q_3$. Thus, the conductance of the transistor $Q_3$ rises. When the signal STB is set to 0, the gate electrode of the transistor $Q_3$ is set to the floating state.

When the drive pulse $\phi_1$ is input to the scanning circuit 101, the scan pulse $\phi_{11}$ synchronized with the drive pulse $\phi_1$ is output. Since the transistors $Q_1$ and $Q_2$ are in the off state, the scan pulse $\phi_{11}$ appears as an output $B_1$ through the transistor $Q_3$. At that time, the "1" level output $B_1$ further increases the gate potential of the transistor $Q_3$ through the bootstrap capacitor $C_3$. Thus, most of the voltage of the scan pulse $\phi_{11}$ appears as the output $B_1$ without decreasing.

At the same time, the transistor $Q_{s3}$ of the second stage is turned on by the output $B_1$. The voltage VDD is applied to the gate electrode of the transistor $Q_3$ of the second stage. The conductance of the transistor $Q_3$ rises. The transistor $Q_{s3}$ is turned off by the "0" level output $B_1$. The gate electrode of the transistor $Q_3$ is set to the floating state.

Subsequently, when the scan pulse $\phi_{21}$ is output synchronously with the drive pulse $\phi_2$, the transistors $Q_{g1}$ to $Q_{g3}$ of the first stage are turned on. All of the gate potentials of the transistors $Q_1$ to $Q_3$ are reset to the grounding potential. Thus, the transistors $Q_1$ to $Q_3$ are turned off.

Next, when the scan pulse $\phi_{12}$ is set to 1 synchronously with the drive pulse $\phi_1$, the pulse $\phi_{12}$ passes through the transistor $Q_3$ whose conductance has increased. The scan pulse $\phi_{12}$ appears as an output $B_2$ due to the bootstrap effect.

In a manner similar to the above, outputs $B_3$, $B_4$, ... , $B_n$ are successively output synchronously with the scan pulses $\phi_{13}$, $\phi_{14}$, ..., $\phi_{1n}$. That is, in the embodiment, the color line sensor of B is scanned and its sensor signal is sequentially output.

Next, to select and scan the color line sensor of G, the start pulse $\phi_s$ is supplied to the scanning circuit 101 and, thereafter, the selection signal STG is set to 1. Thus the transistor $Q_{s2}$ of the first stage is turned on, the gate potential of the transistor $Q_2$ rises, and the conductance of only the transistor $Q_2$ increases.

When the scan pulse $\phi_{11}$ is output, an output $G_1$ appears through the transistor by the bootstrap effect. In a manner similar to the above, $G_2$, $G_3$, ... are sequentially output synchronously with the scan pulses $\phi_{12}$, $\phi_{13}$, ... , the color line sensor of G is scanned, and its sensor signal is sequentially output.

The same shall also apply to the case of selecting the color line sensor of R. The transistor $Q_{s1}$ of the first stage is turned on by setting the selection signal STR to 1.

As mentioned above, according to the embodiment, either one of the line sensors of R, G, and B can be selected by the selection signal STR, STG, or STB. Only the selected line sensor can be scanned by the scanning circuit 101.

Although the embodiment has been described with respect to the case of the color line sensors of RGB, the invention is not limited to this example but can be obviously applied to a general sensor having a plurality of lines.

The invention can be also applied to a construction such that a plurality of lines are selected and signals are read out by a plurality of signal lines.

As described in detail above, since the sensor drive apparatus according to the invention has selection means which can select a desired one of a plurality of lines, a plurality of lines can be independently driven by one scanning circuit. As compared with the conventional apparatus, the circuit scale can be reduced and high speed operation can be accomplished.

Since the pitch among the lines can be set to a small pitch, in the case of the photosensors, the resolution can be improved. On the other hand, in the case of the color sensor, a color signal can be derived without deteriorating the optical characteristics of RGB.

I claim:

1. A color line sensor apparatus comprising:
   (a) a plurality of color line sensors;
   (b) selection means for selecting one of said plurality of color line sensors; and
   (c) one scanning means, capable of scanning each of the plurality of color line sensors, for scanning the color line sensor selected by said selecting means by providing a scanning signal.

2. An apparatus according to claim 1, wherein said color line sensors have independent output terminals, respectively.

3. An apparatus according to claim 1, further comprising different color filters arranged for said line sensors, respectively.

4. An apparatus according to claim 1, wherein said selection means is arranged beside an outside of said plurality of color line sensors.

5. An apparatus according to claim 4, wherein said scanning means is arranged on a side opposite to said line sensors of said selection means.

6. A color line sensor apparatus comprising:
   (a) a plurality of line sensors having output amplifiers, respectively;
   (b) selection means, arranged beside an outside of said plurality of line sensors, for sequentially selecting a predetermined one of said plurality of line sensors; and
   (c) single scanning means, able to scan each of the line sensors, for scanning the color line sensor selected by said selection means by providing a scanning signal.

7. An apparatus according to claim 6, wherein said scanning means is arranged on an outside of the line sensors.

8. A color line sensor apparatus comprising:
   (a) a plurality of color line sensors;
   (b) scanning means for outputting a scanning pulse;
   (c) selecting means for selecting a color line sensor to be scanned, by selectively applying said scanning pulse to one of said plurality of color line sensors.

9. An apparatus according to claim 8, wherein said plurality of color line sensors have independent output terminals, respectively.

10. An apparatus according to claim 8, further comprising different color filters arranged for said plurality of color line sensors, respectively.

11. An apparatus according to claim 8, wherein said selecting means is arranged beside an outside of said plurality of color line sensors.

12. A color line sensor apparatus comprising:
    (a) a plurality of color line sensors;
    (b) scanning means for outputting a scanning pulse;
    (c) distributing means arranged between each of said plurality of color sensors and said scanning means, for providing the scanning pulse to one of said plurality of color line sensors.

13. An apparatus according to claim 12, wherein said distributing means includes a plurality of switches corresponding to said color line sensors, respectively.

14. An apparatus according to claim 12, wherein said distributing means includes a bootstrap capacitor which raises a voltage of the scanning pulse.

15. An apparatus according to claim 12, wherein said plurality of color line sensors have independent output terminals respectively.

16. An apparatus according to claim 12, further comprising different color filters arranged for said plurality of color line sensors, respectively.

17. An apparatus according to claim 12, wherein said distributing means are driven into a conductive state by a selecting pulse.

18. An apparatus according to claim 12, wherein a plurality of stages of said distributing means are arranged in parallel, and in each stage distributing means corresponding to the same color line sensor are connected to each other and use an output of each stage as a selecting pulse of the next stage.

* * * * *